(12) United States Patent
Yu et al.

(10) Patent No.: US 6,979,112 B2
(45) Date of Patent: Dec. 27, 2005

(54) LIGHT GUIDE PLATE

(75) Inventors: Tai-Cheng Yu, Tu-Chen (TW); Charles Leu, Fremont, CA (US); Ga-lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 190 days.

(21) Appl. No.: 10/638,998

(22) Filed: Aug. 11, 2003

(65) Prior Publication Data

US 2004/0095743 A1    May 20, 2004

(30) Foreign Application Priority Data

Nov. 20, 2002  (TW) ................. 91133790 A

(51) Int. Cl.⁷ ............................................. F21V 7/04
(52) U.S. Cl. ..................... 362/600; 362/619; 362/26; 362/27
(58) Field of Search ............................. 362/31, 26, 27, 362/330, 600, 628, 617, 619; 349/65; 385/146

(56) References Cited

U.S. PATENT DOCUMENTS

| | | | |
|---|---|---|---|
| 5,178,447 A | 1/1993 | Murase et al. | |
| 5,363,294 A | 11/1994 | Yamamoto et al. | |
| 5,709,447 A * | 1/1998 | Murakami et al. | ............ 362/31 |
| 5,718,497 A * | 2/1998 | Yokoyama et al. | ........... 362/31 |
| 5,735,590 A * | 4/1998 | Kashima et al. | ............... 362/31 |
| 5,921,651 A * | 7/1999 | Ishikawa | ...................... 362/31 |
| 5,926,033 A * | 7/1999 | Saigo et al. | .................. 326/31 |
| 6,164,790 A | 12/2000 | Lee | |
| 6,485,157 B2 | 11/2002 | Ohkawa | |
| 6,568,821 B1 * | 5/2003 | Page et al. | ..................... 362/31 |
| 6,612,710 B2 * | 9/2003 | Suzuki et al. | .................. 362/31 |
| 6,612,722 B2 * | 9/2003 | Ryu et al. | .................... 362/331 |
| 6,727,963 B1 * | 4/2004 | Taniguchi et al. | ............ 349/65 |
| 6,761,460 B2 * | 7/2004 | Yang | ............................ 362/31 |
| 6,767,105 B2 * | 7/2004 | Nakahashi et al. | ........... 362/27 |
| 2002/0197051 A1 * | 12/2002 | Tamura et al. | .............. 385/146 |

* cited by examiner

*Primary Examiner*—John Anthony Ward
*Assistant Examiner*—Jacob Y. Choi
(74) *Attorney, Agent, or Firm*—Wei Te Chung

(57) ABSTRACT

A light guide plate (20) includes a light input end (21), a light output face (23) adjacent the light input end, and a back face (22) opposite to the light output face. A plurality of fine dots (26) are formed on the back face arranged in a uniform, rectangular array. The dots in a same column have a same size. The dots in a same row increase in size. A radius r of the dots in each row thereof varies as a function of a column number X of a given dot, in accordance with the formula: $r = A + BX + CX^2 + DX^3 + EX^4 + FX^5$, wherein: the column number X varies in consecutive whole numbers from a value of one for the column nearest the light input end to a maximum value for the column most distal from the light input end; and A, B, C, D, E, and F are constants.

16 Claims, 3 Drawing Sheets

LIGHT GUIDE PLATE

BACKGROUND OF THE INVENTION

1. Field of the Invention

The present invention relates to a light guide plate used in a backlight module for a liquid crystal display, and more particularly to a light guide plate having a dot pattern used in a backlight module for a liquid crystal display.

2. Description of Prior Art

Generally, a liquid crystal display device includes a liquid crystal panel having two substrates and a liquid crystal inserted therebetween, and a backlight module disposed under the liquid crystal panel. The backlight module is arranged to distribute light from a light source uniformly over the surface of the liquid crystal panel. There are several kinds of backlight modules, including a direct back light type (or direct type) and an edge light type. Generally, in a direct type backlight module, a light source is disposed inside the display area of the liquid crystal panel, thus, the brightness distribution of the liquid crystal panel is not uniform and the liquid crystal and the TFT switching elements can be damaged by the heat energy of the light source. Furthermore, it is very difficult to reduce the thickness of the direct type backlight module.

Generally, an edge type backlight module comprises a light guide plate, a light source attached to at least one edge of the light guide plate, and a reflecting sheet formed at a bottom surface of the light guide plate, a diffusing sheet disposed on the light guide plate and a light condenser disposed on the diffusing sheet. The light source can be a linear light source or a point light source. Because the light source is disposed at the edge of the light guide plate, the thickness of the LCD can be minimized. Furthermore, the liquid crystal and the TFT switching elements are not damaged by the heat energy of the light source. Therefore, the edge light type has some advantages over the direct type in that it is thinner and provides enhanced picture quality.

However, the brightness of the light emitted to the liquid crystal panel by the edge type backlight module decreases according to the distance from the light source. In order to overcome this problem, and to improve the uniformity and efficiency of luminance, a dot pattern or a pattern of V-shaped grooves is formed on the bottom surface of the light guide plate such that a density of the dot pattern or the V-shaped groove pattern varies as a function of distance from the light source. Using these patterns in a light guide plate results in the brightness of the light which is incident on the liquid crystal panel being made more uniform. In the case of the dot pattern, a size of the dots increases as the distance from the light source attached on one edge of the light guide plane increases. In the case of the V-shaped groove pattern, the distance between adjacent grooves decreases as the distance from the light source increases. When the incident light transmits in the light guide plate, the dot pattern or the V-shaped groove pattern scatters the incident light for uniformly transmitting the light to the light output surface.

U.S. Pat. No. 5,363,294 discloses a surface light source device having a light guide plate with a dot pattern (shown in FIG. 4). The surface light source device comprises a light guide plate 1, a linear light source 2 positioned along one end edge of the light guide plate 1, an end edge reflection layer 4 provided on an opposite end edge of the light guide plate 1, a light diffusion/transmission section 3 provided on a back face of the light guide plate 1, a diffusion layer 6 provided on an emitting face opposite to the back face of the light guide plate 1, a back face reflection layer 5 provided on the back face of the light guide plate 1, and a curved reflection plate 7 provided to enclose the linear light source 2. The light diffusion/transmission section 3 has a dot pattern.

Further referring to FIG. 5, a ratio of an area of the light diffusion/transmission section 3 which is covered by the dots as a portion of the whole area of the back face of the light guide plate 1 gradually increases with an increase in distance from the light source 2, and then is constant in a large, furthest end region from the light source 2.

However, light generated by the light source 2 and transmitted in the light guide plate 1 generally reflects several times between the emitting face and the back face of the light guide plate 1. A decrease in light intensity emitted at the emitting face is not linear with an increase in distance from the light source 2. Thus, it is difficult to achieve an uniformity in light output from the emitting face since the ratio of the area of the dots as a function of total area increases linearly from the light source to the region near the end edge of reflection layer 4.

SUMMARY OF THE INVENTION

In view of the above-described drawbacks, an object of the present invention is to provide a light guide plate used in a backlight module for a liquid crystal display which can improve the uniformity of luminance of the backlight module.

In order to achieve the object set out above, a light guide plate in accordance with the present invention comprises a light input end, a light output face adjacent the light input end, an end face opposite to the light input end, a back face opposite to the light output face and adjacent the light input end, and two opposite side faces. A plurality of fine dots are formed on the back face arranged in a uniform, rectangular array composed of parallel rows and columns of dots. The dots in a same row, each of which rows are substantially perpendicular to the light input end, increase in size from a smallest dot nearest the light input end to a largest dot most distal from the light input end. A radius r of the dots in each row thereof varies as a function of a column number X of a respective dot, in accordance with the formula: $r = A + BX + CX^2 + DX^3 + EX^4 + FX^5$, wherein: the column number X varies from a value of one for the column nearest the light input end to a maximum value for the column most distal from the light input end; and A, B, C, D, E, and F are constants that are determined by a thickness and a size of the light guide plate.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
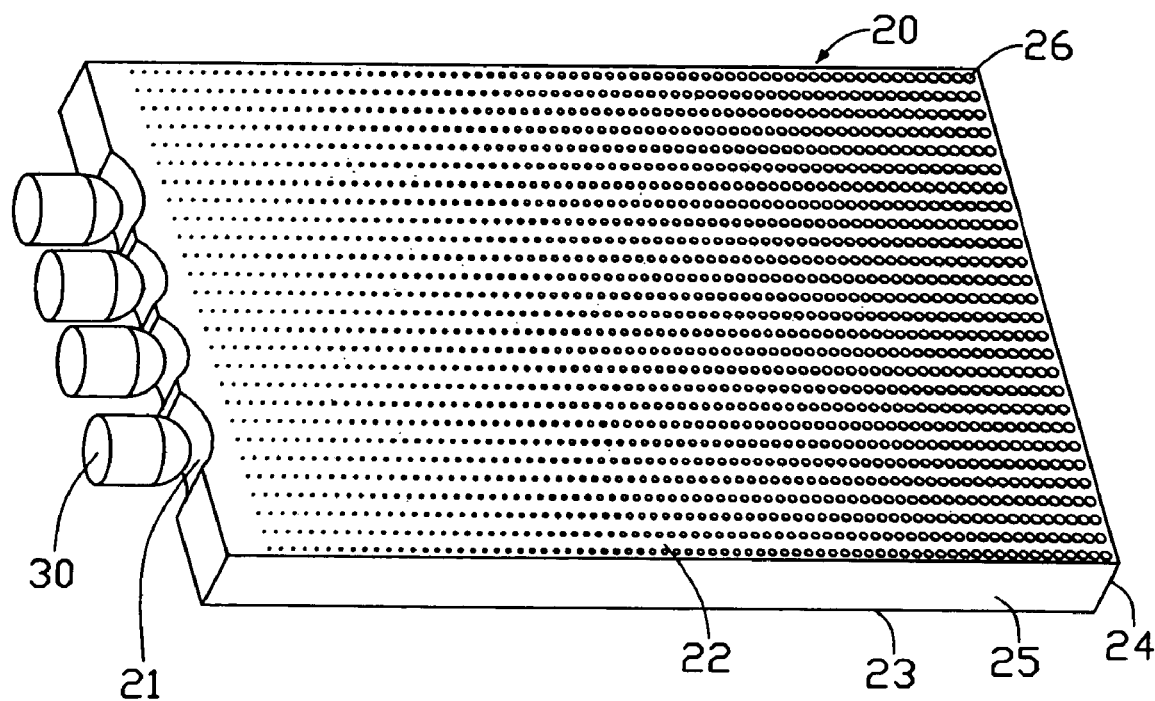
FIG. 1 is a perspective view of a back side of a light guide plate assembled with light sources for use in a backlight module, according to a preferred embodiment of the present invention.

Referring to FIG. 1, a light guide plate 20 in accordance with a preferred embodiment of the present invention is substantially a rectangular plate, and is used in a backlight module. The light guide plate 20 comprises a light input end 21, a light output face 23 adjacent the light input end 21, an end face 24 opposite to the light input end 21, a back face 22 opposite to the light output face 23 and adjacent the light input end 21, and two opposite side faces 25 (only one labeled).

The light guide plate 20 is made from a transparent material such as acrylic ester, polycarbonate, polyvinyl ester, or glass. The light input end 21 comprises a plurality of evenly spaced, arcuate concave surfaces. A plurality of light sources 30 are provided adjacent the light input end 21, respectively corresponding in number and position to the concave surfaces of the light input end 21. The light sources 30 can be diodes or other suitable point light sources. Incident light generated from the light sources 30 enters the light guide plate 20 via the light input end 21. An anti-reflection coating can be deposited on the light input end 21, to enable the incident light to easily enter the light guide plate 20. The end face 24 and the side faces 25 of the light guide plate 20 can each have a reflecting plate attached thereon, or can each be coated with a reflective coating, to prevent light from emitting from the end face 24 or the side faces 25.

Figure 2:
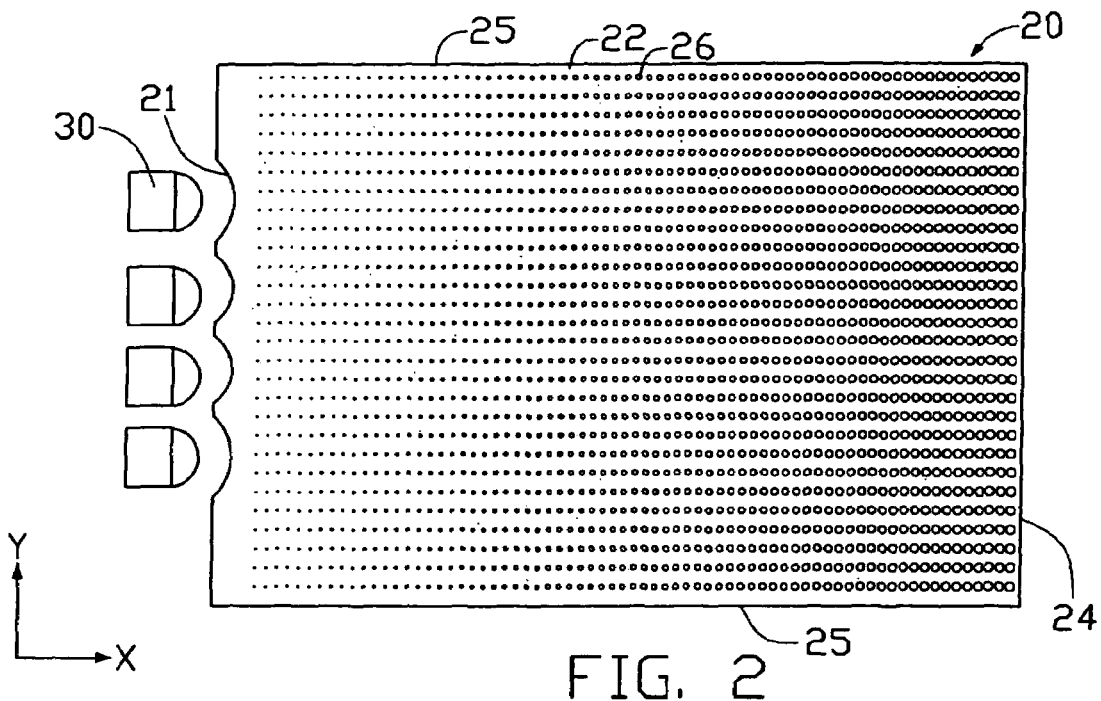
FIG. 2 is a plan view of a back face of the light guide plate and light sources of FIG. 1 showing a dot pattern formed on the back face of the light guide plate.

Referring to FIG. 2, a dot pattern comprising a plurality of fine dots 26 is formed on the back face 22 of the light guide plate 20 to provide uniformity of luminance emitting from the output face 23. The dot pattern is arranged in a uniform, rectangular array. The dot pattern can be fanned on the back face 22 by printing or injection molding. The array of dots 26 are arranged in evenly spaced rows parallel to an x-axis (shown in FIG. 2), which is perpendicular to the light input end 21 of the light guide plate 20. The array of dots 26 are arranged in evenly spaced columns parallel to a y-axis, which is parallel to the light input end 21. The dots 26 of the dot pattern in a same column have a same size. The dots 26 of the dot pattern in a same row sequentially increase in size from a smallest dot 26 nearest the light input end 21 to a largest dot 26 most distal from the light input end 21. A radius r of the dots 26 in each row varies as a function of a column number X of a given dot 26, in accordance with the formula: $r=A+BX+CX^2+DX^3+EX^4+FX^5$, wherein: the column number X varies in consecutive whole numbers from a value of one for the column nearest the light input end 21 to a maximum value for the column most distal from the light input end 21; and A, B, C, D, E, and F are respectively constants, such as any number in the range from 1–9, that are determined by a thickness and other dimensions of the light guide plate 20.

Figure 3:
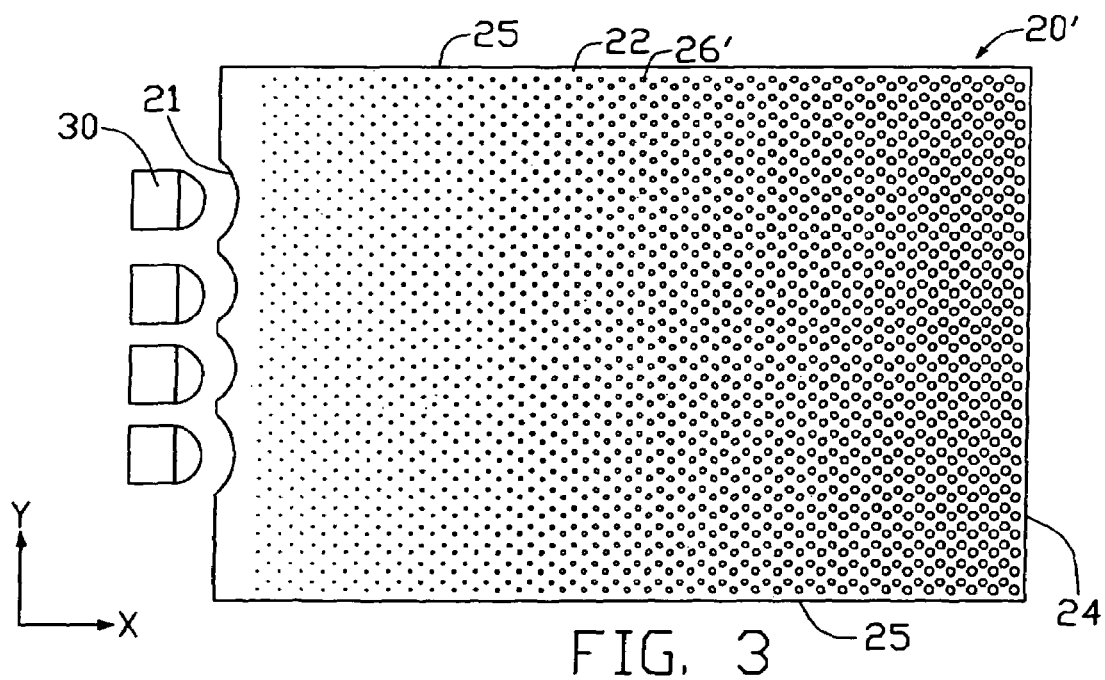
FIG. 3 is a plan view of a back face of a light guide plate and light sources in accordance with an alternative embodiment of the present invention, showing a dot pattern formed on the light guide plate.
Figure 4:
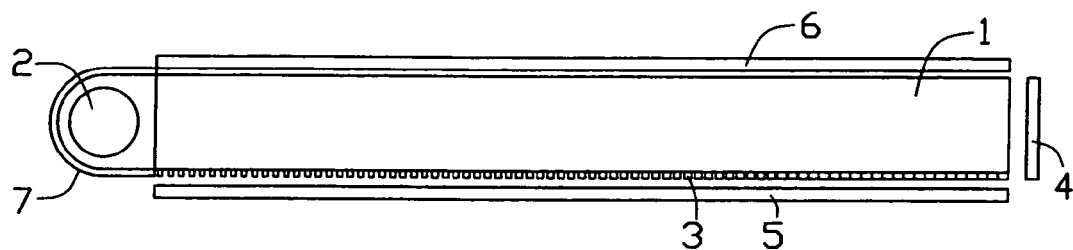
FIG. 4 is a side view of a conventional surface light source.
Figure 5:
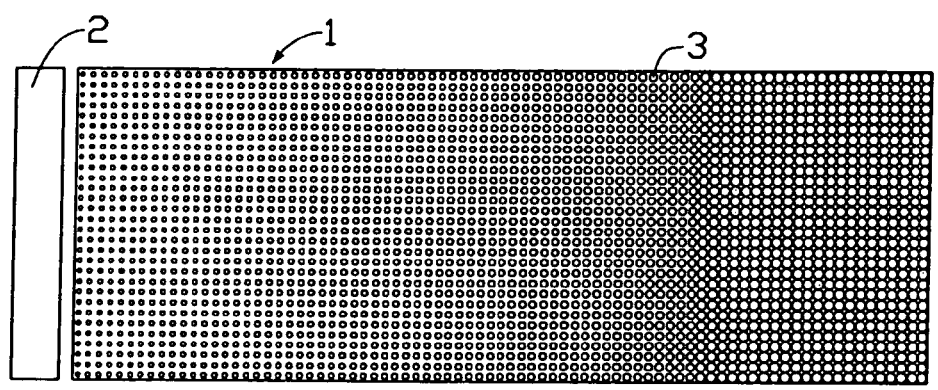
FIG. 5 is a plan view of a dot pattern formed on a back face of a light guide plate of the conventional surface light source of FIG. 4.

FIG. 3 shows an alternative embodiment of the light guide plate 20' of the present invention, in which the dots 26' are arranged differently. Adjacent columns of the dots 26' are offset from each other along the y-axis such that any dot 26' in one column is substantially half-way between two nearest dots 26' in an adjacent column.

In the preferred embodiment, the dots 26 are cylindrical, and the dots 26 are formed on the back face 22. In alternative embodiments, the dots 26 can have other shapes, and can be formed on the back face 22 using other methods. For example, the dots 26 can be hemispherical, conical, or frustum-shaped, and can be formed on the back face 22 by injection molding.

In addition, the light guide plate 20 according to the present invention can have alternative configurations. For example, the light guide plate 20 can be wedge-shaped, wherein a thickness of the light guide plate 20 at the light input end 21 is greatest and the thickness of the light guide plate 20 at the end face 24 is least. In addition, the light input end 21 can be a flat surface, with the light source 30 being a linear light source. Furthermore, the dots 26 can be formed on the light output face 23 of the light guide plate 20 instead of on the back face 22.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A light guide plate used in a backlight module for a liquid crystal display, comprising:
   a light input end;
   a light output face adjacent the light input end;
   an end face opposite to the light input end;
   a back face opposite to the light output face;
   two side faces; and
   a plurality of fine dots formed on the back face, the dots being arranged in evenly spaced columns parallel to a y-axis, which is parallel to the light input end, the dots being arranged in evenly spaced rows parallel to an x-axis, which is perpendicular to the light input end, the dots in a same column having a same size and the dots in a same row sequentially increasing in size;
   wherein a radius r of the dots in each row thereof varies as a function of a column number X of a given dot, in accordance with the formula: $r=A+BX+CX^2+DX^3+EX^4+FX^5$, wherein the column number X varies in consecutive whole numbers from a value of one for the column nearest the light input end to a maximum value for the column most distal from the light input end; and A, B, C, D, E, and F are respectively constants, and each of the constants is in the range from 1 to 9.

2. The light guide plate as described in claim 1, wherein the plurality of dots are arranged in a uniform, rectangular array.

3. The light guide plate as described in claim 1, wherein adjacent columns of the dots are offset from each other along the y-axis such that any dot in one column is substantially half-way between two nearest dots in an adjacent column.

4. The light guide plate as described in claim 1, wherein the end face and the two side faces respectively comprise a reflecting member attached thereon.

5. The light guide plate as described in claim 1, wherein the light input end further comprises an anti-reflecting coating formed thereon.

6. The light guide plate as described in claim 1, wherein the plurality of dots have any one or more shapes selected from the group consisting of cylindrical, hemispherical, conical, and frustum-shaped.

7. The light guide plate as described in claim 1, wherein the light guide plate is a sheet type light guide plate having a uniform thickness, or a wedge-shaped type light guide plate.

8. A light guide plate used in a backlight module for a liquid crystal display, comprising:
- a light input end;
- a light output face adjacent the light input end;
- an end face opposite to the light input end;
- a back face opposite to the light output face;
- two side faces; and
- a plurality of fine dots formed on the light output face, the dots being arranged in evenly spaced columns parallel to a y-axis, which is parallel to the light input end, the dots being arranged in evenly spaced rows parallel to an x-axis, which is perpendicular to the light input end, the dots in a same column having a same size and the dots in a same row sequentially increasing in size;
- wherein a radius r of the dots in each row thereof varies as a function of a column number X of a given dot, in accordance with the formula: $r=A+BX+CX^2+DX^3+EX^4+FX^5$, and wherein the column number X varies in consecutive whole numbers from a value of one for the column nearest the light input end to a maximum value for the column most distal from the light input end; and A, B, C, D, E, and F are constants, and each of the constants is in the range from 1 to 9.

9. The light guide plate as described in claim 8, wherein the plurality of dots are arranged in a uniform, rectangular array.

10. The light guide plate as described in claim 8, wherein adjacent columns of the dots are offset from each other along a y-axis that is parallel to the light input end, such that any dot in one column is substantially half-way between two nearest dots in an adjacent column.

11. The light guide plate as described in claim 8, wherein the plurality of dots have any one or more shapes selected from the group consisting of cylindrical, hemispherical, conical, and frustum-shaped.

12. The light guide plate as described in claim 8, wherein the light guide plate is a sheet type light guide plate having a uniform thickness, or a wedge-shaped type light guide plate.

13. A light guide plate assembly, comprising:
- a light guide plate comprising a light input end, a light output face adjacent the light input end, an end face opposite to the light input end, a back face opposite to the light output face, two side faces, and a plurality of fine dots formed on the back face, the dots being arranged in evenly spaced columns parallel to a y-axis, which is parallel to the light input end, the dots being arranged in evenly spaced rows parallel to an x-axis, which is perpendicular to the light input end, the dots in a same column having a same size and the dots in a same row sequentially increasing in size; and
- a light source provided adjacent the light input end of the light guide plate;
- wherein a radius r of the dots in each row thereof varies as a function of a column number X of a given dot, in accordance with the formula: $r=A+BX+CX^2+DX^3+EX^4+FX^5$, and wherein the column number X varies in consecutive whole numbers from a value of one for the column newest the light input end to a maximum value for the column most distal from the light input end; and A, B, C, D, E, and F are constant, and each of the constants is in the range from 1 to 9.

14. The light guide plate as described in claim 13, wherein the light input end comprises a plurality of evenly spaced, arcuate concave surfaces.

15. The light guide plate as described in claim 14, wherein the light source comprises a plurality of point light sources provided adjacent the light input end, respectively corresponding in number and position to the concave surfaces of the light input end.

16. The light guide plate as described in claim 13, wherein the light input end comprises a flat surface, with the light source being a linear light source.

\* \* \* \* \*